April 1, 1958   R. LEE ET AL   2,829,087
TAPERED CATALYST LEG
Filed Jan. 6, 1953   3 Sheets-Sheet 3

INVENTORS
Robert D. Drew
Russell Lee
BY
Francis F. Johnston
AGENT 2,829,087

TAPERED CATALYST LEG

Russell Lee and Robert D. Drew, Wenonah, N. J., assignors to Socony Mobil Oil Company, Inc., a corporation of New York Application January 6, 1953, Serial No. 329,882

10 Claims. (Cl. 196—52)

The present invention relates to a method of transferring particle-form solid contact mass material from a zone of given pressure to a zone of relatively higher or lower pressure and more particularly to a method of dissipating the energy of a steam of vapors flowing concurrent or counter-current to a substantially continuous column of flowing contact mass material.

As is well known, when petroleum gas oil fractions are vaporized and heated to temperatures of the order of 800° F. and higher and brought into contact with particle-form solid adsorptive contact mass materials a substantial conversion to materials of gasoline boiling range takes place. The contact mass material used may be any of the naturally occurring clays, such as fuller's earth, other natural or altered natural adsorptive materials or synthetic materials, usually alumina, silica, or associations of these, with or without added materials, such as metal salts and/or oxides, added for some specific purpose. These materials are usually referred to generically as "clay type" catalysts. The reaction conducted may be cracking, or any other conversion of hydrocarbons, and indeed may be any organic reaction capable of accomplishment in the presence of such contact masses.

More recently, processes of this nature have been developed wherein the particle-form solid contact mass material is flowed cyclically through one zone wherein a reaction is continuously accomplished and then through a second zone wherein regeneration is continuously accomplished, returning from thence to the reaction zone. This invention has to do particularly with systems working in this manner.

It is common knowledge that the pressure exerted at the base of a column of liquid is equal to the density of the liquid multiplied by the height of the column. In other words, the pressure in pounds per square inch at the base of a column of liquid is found by employing the formula, $$\frac{H \times D}{144} = P$$

where H is the height in feet of the column of liquid, D is the density of the liquid in pounds per cubic foot and P is the pressure in pounds per square inch (p. s. i.). It will be noted that the diameter of the column of liquid is not a factor in this equation. This equation can be used to determine the height of a column of particle-form contact mass material required to introduce contact mass material into a zone at a higher pressure when the pressure differential is less than 5 p. s. i. Experience has established that no problem is presented when the substantially continuous column of downwardly flowing contact mass material is of the order of 15 to 18 feet in length; i. e., when the contact mass material flows from a zone at atmospheric pressure to a zone at about 3 p. s. i. g. However, when the contact mass material flows into a zone at a pressure of the order of 5 p. s. i. g. or more, the height of the column of contact mass material must be increased disproportionately with respect to the increase in the difference in pressure. Thus, it has been found that, generally, when the pressure differential between the zone of relatively low pressure and the zone of relatively high pressure is 30 percent absolute or more, the required height of the column of contact mass material is disproportionately greater than the increase in the pressure differential.

Accordingly, the present invention provides a method for flowing particle-form solid contact mass material downwardly as a substantially continuous column from a zone of given pressure to a zone of higher pressure, wherein the absolute pressure in the zone of higher pressure is at least 30 percent greater than the absolute pressure in the zone of lower pressure. One embodiment of the present invention also provides a particularly satisfactory means for accomplishing the dissipation of the energy of the upwardly flowing vapors or gas.

Briefly, the present invention comprises flowing the particle-form solid contact mass material downwardly as a continuous column of ever-changing cross-section in which the cross-section of the column at any point in the length of the column is related to the cross-section of the column at any other point in the column by the formula $$\frac{A_2}{A_1} = \left(\frac{P_1}{P_2}\right)^{\frac{1}{n+2}}$$

where $A_1$ and $A_2$ are the cross-sectional areas of the downwardly flowing substantially continuous column of particle-form solid contact mass material at the selected levels 1 and 2 respectively, $P_1$ and $P_2$ are the absolute pressures existing at levels 1 and 2 respectively, and $n$ is a constant depending upon flow conditions. The value of $n$ has been found to be minus 1 for viscous flow and minus 0.15 for turbulent flow, with intermediate values for the mixed flow regions. For contact mass particle sizes between 0.10 and 0.15 inch, for pressure gradients between about 4 and 6 inches of water per foot; i. e., about 0.14 to about 0.22 p. s. i. per foot of contact mass column, and for temperatures of from about 800° to about 900° F. such as will be encountered when feeding particle-form solid contact mass material against steam or flue gas, the type of flow will be mixed and the value of $n$ will average about minus 0.6.

While the desired end can be accomplished in several ways, the most practical industrially applicable means of dissipating the energy of the upwardly or downwardly flowing stream of gas is to provide a confined space, through which the downwardly flowing substantially continuous column of contact mass material passes, of such structure that the cross-sectional area of the confined space conforms to the equation given hereinbefore.

The invention and its surroundings will best be understood by reference to the drawings attached hereto, in which.

Figures 1, 3:
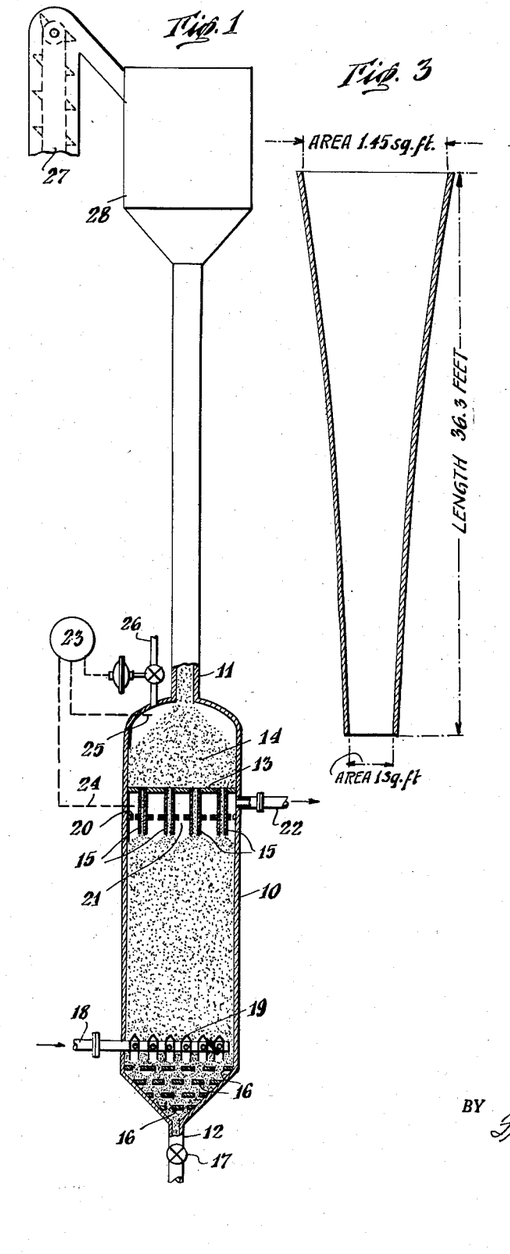
Figure 1 represents a prior art column of substantially constant cross-section.
Figures 3 and 4 show specific forms of the invention.

In Figure 1, item 10 is a reactor, to which particle-form solid contact mass material is fed at 11, and from which it is removed at 12. Within reactor 10, some distance below its top, there is a partition 13, forming a contact mass storage chamber 14. Dependent from 13 and uniformly spaced with respect to the cross-section of 10 are contact mass flow pipes 15. Contact mass flows from 11 into 14 and then through pipes 15 into 10. At the bottom of 10 there are arranged a series of baffle plates, in which plates orifices are so arranged as to first withdraw the contact mass in a large number of small streams through orifices uniformly distributed across the cross-sectional area of the reactor and then successively combine those streams until a single exit stream of contact mass is formed. Thus, the contact mass passes downward uniformly in 10. Adjustment of valve 17 in connection with the rate of flow of contact mass serves to maintain 10 at all times substantially filled with a downwardly moving column of contact mass material.

Reactants are introduced at 18 and distributed in the reactor by grid 19. Near the top of 10, above the level of contact mass pass and surrounding pipes 15 there is a plate or partition 20, provided with orifices 21. Reactants flowing out of the contact mass through orifices 21 to collect in the chamber between partitions 20 and 13 and are removed by pipe 22. In order to prevent reactants from escaping upwardly through incoming contact mass, a differential pressure control instrument 23 is utilized, observing the reactor pressure at point 24 and the pressure in chamber 14 at point 25, and so controlling an inert gas, such as flue gas or steam, introduced through valved pipe 26, as to maintain such a pressure in 14 that reactants will not flow thereinto. Since it is conventional to conduct the vaporous reaction products collecting in the chamber between partitions 20 and 13 to fractionating towers, the vapors in this chamber are usually under a pressure of at least 5 p. s. i. g. and in many instances under a pressure of 10 p. s. i. g. The pressure in 14 must be greater than that in the chamber between partitions 20 and 13 so that reactants will not flow into chamber 14. Consequently, the pressure differential between feed hopper 28 and chamber 14 will be at least 5 p. s. i. g.

The present invention and the advantages derived therefrom can best be understood and appreciated by an illustrative example providing a numerical illustration of the effect of decreasing the cross-sectional area of the substantially continuous column of particle-form solid contact mass material with the increase in pressure in accordance with the equation $$\frac{A_2}{A_1} = \left(\frac{P_1}{P_2}\right)^{\frac{1}{n+2}}$$

Assume that the reactor is operating at a pressure of 10 p. s. i. gauge at point 24. Chamber 14 will be held very close to 10 p. s. i. gauge by introduction of inert gas. But the contact mass is handled between regeneration and the reactor by a system of elevators and bin-hoppers, such as elevators 27 and hopper 28 which can only be held at pressures near atmospheric. With hopper 28 at atmospheric pressure and chamber 14 at about 10 p. s. i. gauge, contact mass feed leg 11 must be long enough so that the pressure drop encountered by gas flowing from 14 to 28 through 11 is at least 10 p. s. i. total.

Figure 2:
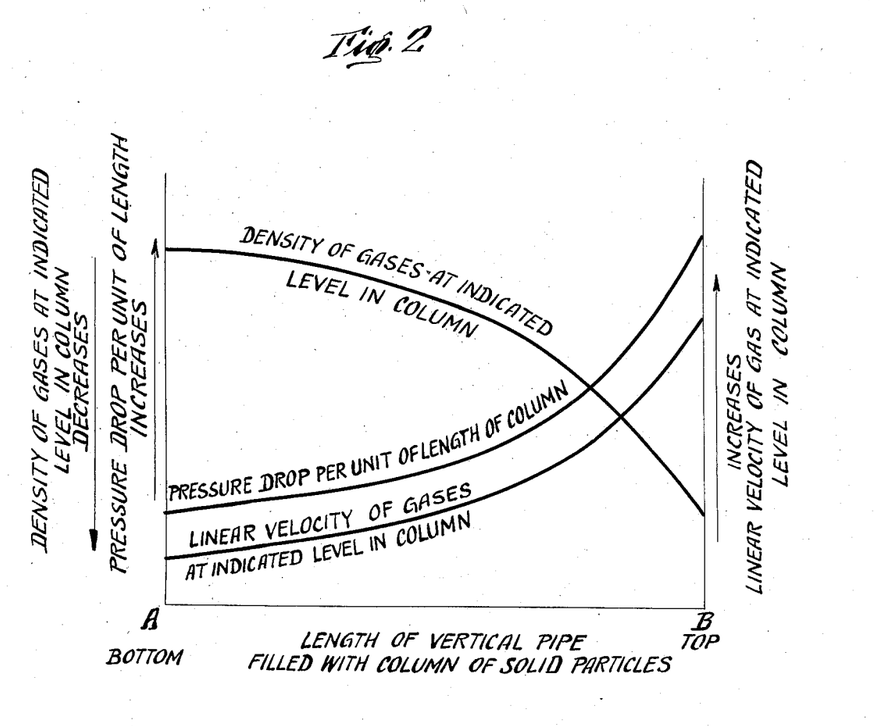
Figure 2 shows some graphical data.

To understand what happens in a column such as 11, the conditions shown in Figure 2 may be of assistance. In Figure 2 the base line AB can represent the length of a vertical pipe of constant diameter filled with a particle-form solid, and through which a gas flows, from bottom to top at a constant mass velocity. Obviously, at any point in the column, the pressure on that gas is equal to the pressure existing at A diminished by the pressure drop experienced between A and the point measured. So, since density of the gas varies inversely as pressure, we find that density of the gas decreases as we go up the column, as shown in Figure 2, and also it follows that linear velocity of the gas increases. Now, the pressure drop experienced in each unit length of such a column varies inversely as the density of the gas flowing through that unit length, so, throughout the column, we have pressure drop varying as shown. Up to this point, we have not specified whether the solid materials were moving or not. To insure movement, the rate of flow of gas should not be great enough to disrupt the contact mass bed and cause boiling.

For any contact mass of given density, there is a very definite upper limit of pressure drop per foot of path through contact mass which can be experienced without stopping downward flow of contact mass. Obviously, the pressure drop in the last foot of contact mass at the top of the column is the ruling factor. Starting from this, the longer the column is, the less will be the average pressure drop per foot of length. Consequently, the necessary length of column, in a column of uniform diameter, increases at a much greater rate than does the pressure which can be counteracted at the base of the column.

Increases in column length are unduly costly both in investment and operation, since they call for increases in height of elevators, and supporting structure for bins and elevators, and increases in operating cost for elevating contact mass.

We have found that contact mass feed legs can be improved in effectiveness and held to a minimum length for any desired total pressure drop for the flow of gases from bottom to top by utilizing a construction which arrives at a uniform pressure gradient throughout the length of the feed leg by varying cross-sectional area from the top to the bottom, providing the larger area at the top. This may be done either by using a tapered feed leg which tapers from a given top end cross-sectional area to a smaller cross-sectional area at the bottom, or it may be done by constructing the feed leg of two or more sections, each of uniform cross-sectional area throughout its length, but each varying in cross-sectional area from its neighbors, and arranging these sections so as to give progressively smaller areas from top to bottom of the feed leg.

Such an arrangement will give a contact mass feed leg wherein the pressure drop in an upwardly flowing gas will be substantially the same for any unit length of the column, taken anywhere along the column.

Assume a reactor operating at 10 p. s. i. gauge (24.7 p. s. i. absolute), with the contact mass feed leg open at its upper end to atmosphere (14.7 p. s. i. absolute). Further assume that a minimum cross-sectional area of the feed leg of one square foot is desired to permit a reasonable maximum linear velocity of contact mass travel. Further assume that the contact mass has an apparent specific gravity of about 0.7 compared with water. For such a contact mass the highest permissible pressure drop for an upwardly flowing gas will be about 7.5 inches of water per foot of contact mass column, or 0.275 p. s. i. per foot of column. The shortest permissible colmn will be $$(24.7 - 14.7) \div 0.275 = 36.3 \text{ feet long}$$

Its area at the top can be determined by using the cited equation, where $A_1 = 1$ sq. foot, $P_1 = 24.7$, $P_2 = 14.7$, $n = -0.6$ and solving for $A_2$ $$\frac{A_2}{1} = \left(\frac{24.7}{14.7}\right)^{\frac{1}{-0.6+2}} = \sqrt[1.4]{1.68} = 1.45 \text{ sq. ft.}$$

Figure 4:
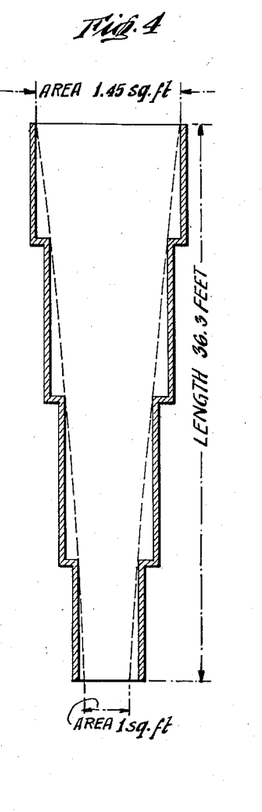

This same method may be used to determine the area at any point along the length of the column, and would result in a feed leg of the design shown in Figure 3. It will be noted that the degree of taper is not constant where the leg is so designed. However, the sides will in many cases, depart so little from rectilinear that a uniformly tapered shape may be used. The efficiency of a tapered leg can be approached, with a construction which may be cheaper, by selecting a series of suitably sized short cylinders to conform substantially to the desired taper, as shown in Figure 4. It will be realized that the feed leg cross-section need not be circular, but may be of any convenient shape, the sole criterion being the proportioning of areas. It will be understood that the word "taper," where used in claims, refers, unless otherwise limited, to the varying taper achieved by strict adherence to the formula, to uniform taper, and to the stepwise taper gotten by using the plurality of short cylinders of varying sizes.

Material savings may be made by this design. For example: if we had as a limiting pressure drop 6.0 inches of water per foot, with a reactor at 11.6 p. s. i. g., uniform diameter feed leg would be 75 feet long while a tapered feed leg would need be only 53.6 feet long. Or, if we had a properly tapered feed leg 75 feet long, the reactor could be operated at 16.2 p. s. i. g.

These desirable results are obtained by so designing the feed leg that it has a tapered form, such that when contact mass flows downwardly therein and gas flows upwardly therein, the gas at no point flows at a rate sufficient to disrupt the downwardly moving contact mass column, and the column is so proportioned that the pressure drop of that gas in any one unit of length of column is substantially the same as the pressure drop through a similar unit of length at any other point in the column.

It will, of course, be understood that this design satisfies the equation $$\frac{A_2}{A_1} = \left(\frac{P_1}{P_2}\right)^{\frac{1}{n+2}}$$

above described, and that limiting pressure drops per foot of column length can always be most certainly evaluated by actual test with the particular contact mass material involved in the design. With contact masses of density from about 36 to about 65 pound per cubic foot, the maximum pressure drop will be from about 6 to about 11 inches of water per foot of column, respectively.

It will also be understood that these same criteria apply if the protective inert gas is not used, for example, if the feed leg be feeding a regenerator under pressure, where the gas in the regenerator is merely air and flue gas and the feed leg is designed to permit holding a desired regenerator pressure.

Illustrative of the application of the foregoing principles to the problem of transferring particle-form solid contact mass material from a zone at a given pressure to a zone at a lower pressure where the transfer differential is at least 40 p. s. i. and usually greater than 100 p. s. i., is the method of operating a hydrocarbon conversion process wherein the hydrocarbon conversion occurs at super-atmospheric pressures of at least 40 p. s. i. and usually at least 100 p. s. i. greater than the pressure in the regenerator or kiln. In such a method of carrying out a hydrocarbon conversion, the substantially compact column of particle-form solid contact mass material flows from the reaction zone at a given pressure to the regenerator or kiln at a pressure at least 40 p. s. i. and often at least 100 p. s. i. less than the pressure in the reaction zone. When the cross-sectional area or diameter of the flowing substantially compact column of particle-form solid contact mass material is substantially constant and the distance or the length of the conduit through which a column flows is of reasonable length, say 25 feet, the incremental pressure drop per unit of column length or conduit length and the linear velocity of the gas flow occurring with the flow of the column of compact mass material increases progressively as the column approaches the zone of lower pressure. Near the zone of lower pressure the differential pressure is so high that the linear velocity of the gas is in substantial excess of that velocity which if exerted in an upward direction would cause the catalyst to boil. These high velocities cause (1) high catalyst attrition rates, and (2) instable operation of the catalyst transfer means with a tendency for the catalyst transfer means or conduit to blow entirely free of catalyst very suddenly and with explosive violence. By increasing the cross-sectional area of the flowing substantially compact column of particle-form solid contact mass material as it approaches the zone of lower pressure, the differential pressure increment is constant throughout the entire length of the column, and the linear gas velocity likewise is substantially constant, whereby the attrition and the tendency for the particle-form solid contact mass material transfer means to blowout with explosive violence are reduced, if not eliminated. The differences in differential pressure i. e., ΔP increment for flowing columns of substantially constant cross-sectional area or diameter and for flowing substantially compact columns of cross-sectional areas or diameters which are changed in accordance with the equation given hereinbefore, is illustrated by the following tabulation:

| Distance from zone of lower pressure, Feet | Substantially Uniform Cross-Section | | Tapered Cross-section | |
|---|---|---|---|---|
| | P. s. i. g. | ΔP | P. s. i. g. | ΔP |
| 25 | 175 | 0 | 175 | 0 |
| 20 | 155 | 20 | 140 | 35 |
| 15 | 132.2 | 22.8 | 105 | 35 |
| 10 | 105.3 | 26.9 | 70 | 35 |
| 5 | 70.4 | 34.9 | 35 | 35 |
| 4 | 61.8 | 8.6 | 28 | 7 |
| 3 | 51.4 | 10.4 | 21 | 7 |
| 2 | 39.8 | 11.6 (70.4) | 14 | 7 (35) |
| 1 | 23.8 | 16 | 7 | 7 |
| 0 | 0 | 23.8 | 0 | 7 |

NOTE.—The foregoing data are for a substantially compact column of particle-form solid contact mass material having a substantially constant diameter of 1.61 inches, 25 feet long; and for a substantially compact column of particle-form solid contact mass material 25 feet long having a diameter of 1.61 inches at the zone of higher pressure and a diameter of 3.38 inches at the zone of lower pressure and operating at a pressure differential of 175 p. s. i.

A glance at the foregoing tabulation clearly establishes that the decrease in pressure for a substantially compact column of particle-form solid contact mass material of substantially constant cross-sectional area is by no means constant. On the other hand, when the cross-sectional area of the substantially compact column of particle-form solid contact mass material is changed in accordance with the equation given hereinbefore, the change in pressure is substantially constant. Thus, for example, consider the last 5 feet of column adjacent the zone of lower pressure. With a column of substantially constant cross-sectional area, the difference in pressure varies from 8.6 p. s. i. between the 4th and 5th foot from the zone of lower pressure, to 23.8 p. s. i. between the zone of lower pressure and the 1 foot point in the column. On the other hand, when the cross-sectional area of a substantially compact column of particle-form solid contact mass material is changed in accordance with the equation given hereinbefore, the change in pressure is substantially constant between any two points in the column. Thus, the difference in pressure between the point 5 feet from the zone of lower pressure and the point 4 feet from the zone of lower pressure is 7.0 p. s. i. Similarly, the difference in pressure between the point in the column 1 foot from the zone of lower pressure and the point in the column at lowest pressure is 7.0 p. s. i. It is interesting to compare the pressure differential in a column of susbtantially constant cross-sectional area between the point 1 foot from the zone of lower pressure and the end of the column at the zone of lower pressure with the difference in pressure between the same point in a column in which the cross-sectional area is changed in accordance with the equation given hereinbefore. The values as given in the tabulation hereinbefore, are respectively 23.8 p. s. i. and 7.0 p. s. i.

Illustrative of the reduction in loss of particle-form solid contact mass material by changing the cross-sectional area of the column in accordance with the equation given hereinbefore, are the following data: For a column 25 feet long having a substantially constant diameter of 1.61 inches for a pressure differential of 175 p. s. i. through which the catalyst flows at a velocity of 2.1 feet per second; and a substantially compact column of particle-form solid contact mass material, the cross-sectional area or diameter of which is changed in accordance with the equation given hereinafter, from a diameter of 3.08 inches at the zone of higher pressure to a diameter of 6.07 inches at the zone of lower pressure, the column being 20 feet in length, the pressure differential being 175 p. s. i., and the catalyst velocity being 2.55 feet per second, the catalyst forming the column at the zone of higher pressure was in the form of particles, all of which were retained on an 8-mesh screen.

The catalyst particles were passed through both columns in a cyclic manner and the loss by attrition per cycle, i. e., the weight of catalyst which passed an 8-mesh screen at the end of the test, calculated by the equations:

Attrition, weight percent/cycle =

$$\frac{\text{Fines formed in pounds}}{\text{Total lbs. of catalyst circulated}} \times 100$$

and tons lost/day/100 tons circulated/hour = 24 × weight percent loss/cycle.

For the column of substantially constant cross-section, the loss was 4.9 percent. For the column, the cross-section of which varied in accordance with the equation given hereinafter, the loss was 0.75 percent.

| Diameter of zone | | Length of Column, feet | $\Delta P$, p. s. i. | Catalyst Velocity, feet per sec. | Attrition: Tons/Day/100T/Hour | |
|---|---|---|---|---|---|---|
| Higher Pressure | Lower Pressure | | | | through 8-mesh | through 10-mesh |
| 1.61 | 1.61 | 25 | 175 | 2.1 | 3.8 | 1.1 |
| 3.08 | 6.07 | 20 | 175 | 2.55 | 0.44 | 0.31 |

The loss of solid contact material due to attrition was determined for a column 20 feet long having a diameter at the zone of higher pressure of 3.1 inches and increasing, in accordance with the equation given hereinbefore, to a diameter of 6.1 inches at the zone of lower pressure and for a column 20 feet long of a substantially constant diameter of 3.1 inches. The data so obtained is tabulated as follows.

Solid contact material:
    Average diameter of particle—0.128 inches (100% retained on 10-mesh Tyler standard screen)
    Loose bulk density—57.5 pounds/cubic feet.
    Conditions—
      Seal gas—air @ 100° F.
      Pressure drop—175 p. s. i.

| | Substantially constant diameter | | | Diameter increasing according to equation | | |
|---|---|---|---|---|---|---|
| Particle velocity, ft./sec. | 1.10 | 1.93 | 3.07 | 0.90 | 1.90 | 2.90 |
| Attrition: T/D per 100T/Hr. through 10-mesh | 0.93 | 1.54 | 1.25 | 0.71 | 1.07 | 0.73 |
| Relative loss, percent | 100 | 100 | 100 | 76 | 69 | 59 |

The foregoing data establish two facts: (1) that the loss of solid contact mass material by attrition with a column the diameter of which increases from the zone of higher pressure to the zone of lower pressure in accordance with the equation given herein is about 60 to about 75 percent of the loss of solid contact mass material when the column has substantially the same diameter at the zone of lower pressure as the diameter at the zone of higher pressure, and (2) that for a column of substantially constant diameter and for a column the diameter of which increases in accordance with the equation given herein, there is a maximum loss by attrition at a particle velocity of about 1 to about 2.8 feet per second. Consequently, care should be taken if loss by attrition is to be kept at a minimum that the particle velocities are kept below about 1 or above about 2.8 feet per second. Accordingly, particle velocities of about 0.3 to about 1 foot per second or about 2.8 to about 4 feet per second should be used.

In determining the dimensions of a catalyst transfer means by which particle-form solid contact mass material is to be transferred from a zone of given pressure to a zone of lower pressure, wherein the pressure differential is at least 40 p. s. i., the pressure differential through the entire length of the column is known and the uniform pressure drop per unit of length of the column also is known. Accordingly, we have the relation $$\frac{\Delta P}{\Delta L} = K$$

where $\Delta P$ is the pressure drop per unit of length of the column at any selected level along the column, and $\Delta L$ is the unit of length chosen. In the above equation, K is the constant for any given installation, and has a value within the range of 1 to 20 and preferably 1.5 to 5, where $$\frac{\Delta P}{\Delta L}$$

is in terms of pressure drop in p. s. i. per foot of column. Since the pressure in a linear function of the length of the column, the pressure at any point along the column is readily calculated. By substituting the corresponding pressures in the equation given hereinbefore, the diameters of the column at any point for which the pressure has been selected can be calculated, assuming a given diameter of the column at the zone of higher pressure. In selecting the diameter of the column at the zone of higher pressure, the diameter therein must be great enough to pass the catalyst at the maximum intended flow rate, and that diameter can be calculated from known data or determined experimentally. The minimum diameter of the substantially compact column of particle-form solid contact mass material is at the zone of higher pressure and should be so chosen as to correspond to a diameter required for a pipe which would handle about 40 to about 150 percent of the maximum contemplated catalyst circulation rate with no drop in pressure. In addition, this diameter must be such as to permit handling at least the contemplated maximum circulation rate when aided by the difference in pressure between the zone at higher pressure and the zone at lower pressure, at least 40 p. s. i. The length of the column should be such that the difference in pressure in p. s. i. per foot of column is of constant value within the range of about 1 to about 20 and preferably about 1.5 to about 5. The allowable deviation from a constant pressure differential drop along the column may be about 0 to about 50 percent, and preferably about 0 to about 10 percent.

Heretofore, when carrying out such hydrocarbon conversions as reforming which preferably are carried out at pressures of about 100 to about 300 p. s. i. a., and occasionally are carried out at pressures as high as 600 p. s. i. a. in the presence of particle-form solid contact mass material flowing through a reactor as a substantially compact column, it has been necessary to employ a catalyst transfer means whereby the catalyst is transferred from the reactor to a regenerator operating at a much lower pressure, for example atmospheric pressure, but using a catalyst transfer means comprising two gas-tight valves and an interposed depressuring chamber. While such a catalyst transfer means has been found satisfactory from an operational standpoint, it can be replaced by the much simpler catalyst transfer means described hereinbefore. Accordingly, the present invention is particularly useful in such hydrocarbon conversions wherein the particle-form solid contact mass material flows as a substantially compact column through a reaction zone, for example—a reforming zone wherein at least one or all of the molecular changes known as isomerization, dehydrogenation, and dehydrocyclization take place, and the particle-form solid contact mass material is transferred from the reaction zone wherein the reaction takes place at pressures at least 40 p. s. i. higher and often 100 to 300 p. s. i. greater than the pressure in the regenerator or kiln. While the hydrocarbon conversion process can be carried out employing the aforesaid means for transferring the catalyst from a zone of given pressure to a zone of higher or lower pressure, it is preferred when carrying out a hydrocarbon conversion in which the catalyst is transferred from the reactor to a zone of lower pressure, to introduce or inject into the substantially compact column of particle-form solid contact mass material at a point in the vicinity of the reactor, a sealing gas at a pressure sufficient to prevent flow of the gaseous contents of the reactor therefrom. In general, in a reforming operation the seal gas will usually be steam, flue gas, or preferably a hydrocarbon containing recycle gas. The seal gas will be introduced into the column at a pressure of at least about 0.5 pound greater than the pressure existing in the reactor. As the substantially compact column of catalyst flows from the reactor to the zone of lower pressure, the gas, whether it be the vaporous contents of the reactor or the seal gas, flows through the void in the column gradually expanding the column in area, the area increasing progressively along the column in the direction of gas flow in accordance with the equation $$\frac{A_2}{A_1} = \left(\frac{P_1}{P_2}\right)^{\frac{1}{n+2}}$$

where $A_1$ and $A_2$ are the cross-sectional areas of said column at selected levels 1 and 2; $P_1$ and $P_2$ are the absolute gas pressures existing at levels 1 and 2, respectively, said $P_1$ being greater than $P_2$, and $n$ is a constant having a value of minus about 0.15 to minus about 1.0.

While the use of the foregoing equation, $$\frac{A_2}{A_1} = \left(\frac{P_1}{P_2}\right)^{\frac{1}{n+2}}$$

leads to the design of conduit of correct taper for many installations, when greater accuracy is required, as for example when the catalyst flow rate is relatively high and the difference in pressure between the high pressure end and the low pressure end of the conduit or leg is relatively great, a modification of the foregoing equation will provide greater accuracy of rate of taper. As the catalyst flow rate increases, the quantity of gas carried into the leg in the pores of the particles and the interstitial voids between the particles of catalyst in the substantially compact column also increases. As the substantially compact column of particle-form solid contact material or catalyst advances toward the low pressure end of the conduit or leg, the gas in the aforesaid pores and voids expands therefrom and contributes to the frictional pressure gradients. The greater the difference in pressure between the high pressure end and the low pressure end of the conduit or leg, the greater is this effect. Under these conditions, the degree of taper can be calculated with greater accuracy by the equation:

Equation (2)

$$\frac{A_2}{A_1} = \left(\frac{P_1}{P_2}\right)^{\frac{1}{n+2}} \left(\frac{U - 0.068(f_1+f_2)\left(\frac{WSoP_2}{Pc}\right)}{U - 0.068(f_1+f_2)\left(\frac{WSoP_1}{Pc}\right)}\right)$$

where:

$A_2$ and $A_1$ = areas at two different levels in the conduit
$P_1$ and $P_2$ = absolute pressures at the corresponding levels, p. s. i. a.
$U$ = total gas flow rate (including gas in catalyst pores) in lbs./hr.
$W$ = catalyst flow rate, in lbs./hr.
$So$ = gas density at atmospheric pressure and temperature of system in lbs./cu. ft.
$Pc$ = loose bulk density of catalyst in lbs./cu. ft.
$f_1$ = fractional voids, dimensionless
$f_2$ = fractional pores, dimensionless (based upon bulk density)
$n$ = constant, varying from minus 0.15 to minus 1.0
$f_1$ = the interstices between the particles, is determined experimentally, and is the ratio $$\frac{\text{particle density} - \text{bulk density}}{\text{particle density}}$$

$f_2$ = pore volume of catalyst particles $(1-f_1)$ (the pore volume of catalyst is determined experimentally)

Figures 5, 6:
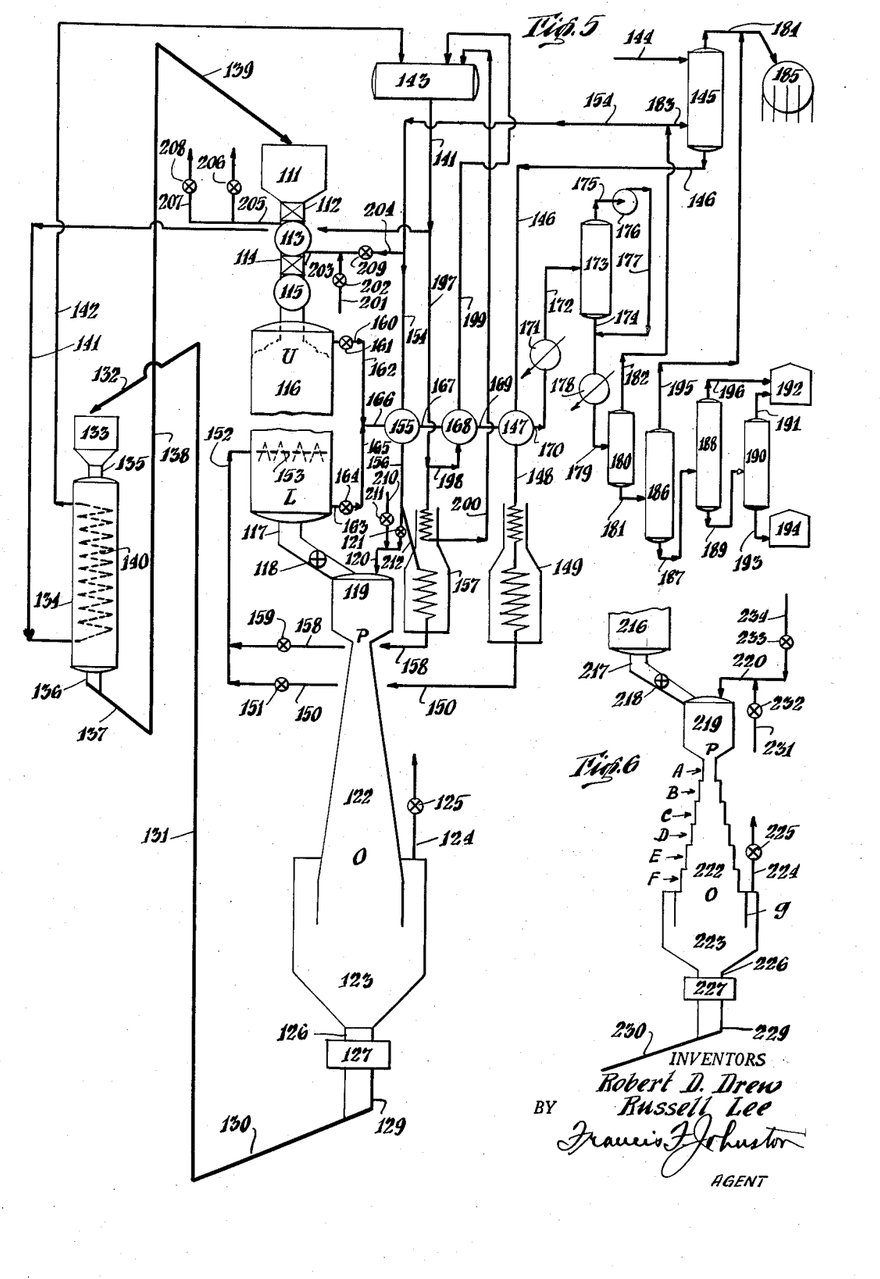
Figures 5 and 6 show the application of the specific forms of the invention illustrated in Figures 3 and 4 to a reforming process. All are diagrammatic.

The application of the principles of the present invention to a reforming process is illustrated in a schematic manner in Figure 5. Thus, active catalyst in reactor feed bin 111 is transferred to the reactor at super-atmospheric pressure, for example—about 100 to 600 p. s. i. a. and preferably 100 to 300 p. s. i. a., by means of a reactor sealing and solid particle transfer means comprising gas-tight valves 112 and 114 and intermediate pressuring chamber 113. The reactor sealing and catalyst transfer means operates in a cyclic manner as follows: With pressuring chamber 113 empty of catalyst and gas-tight valve 114 closed, catalyst flows through gas-tight valve 112 from feed bin 111 into pressuring chamber 113 to fill same to a predetermined level. Gas-tight valve 112 closes and chamber 113 and the contents thereof are purged with an inert and/or non-flammable gas such as flue gas drawn from a source not shown through pipes 201 and 203 with valve 202 open and valve 209 closed. The purge is vented through pipes 205 and 207 with valve 206 closed and valve 208 open, pressuring chamber 113 is then pressurized by introducing a suitable pressuring gas under pressure, for example: recycle gas, drawn from liquid gas separator 180 through pipes 182, 154, and 204 under control of valve 209 is introduced into pressuring chamber 113 with valves 206 and 208 closed until the pressure therein is at least equal to that and preferably somewhat higher, say about 5 pounds, than the pressure in reactor 116. When the pressure in chamber 113 attains the aforesaid predetermined level, gas-tight valve 114 opens and the catalyst in chamber 113 flows into surge chamber 115, gas-tight valve 114 closes, completing the cycle. The catalyst flows as a substantially compact column of particle-form catalyst from surge chamber 115 into reactor 116. In its passage through reactor 116 the catalyst becomes deactivated by a carbonaceous element laid down thereon generally known as coke, the deactivated catalyst flows from reactor 116 through conduit 117 under control of throttling means 118 which may be of any suitable type such as a throttling valve into seal chamber 119. Sealing gas such as steam, flue gas, or preferably hydrocarbon recycle gas drawn from pipe 156 through pipe 120 under control of valve 121, or steam or flue gas drawn from a source not shown through pipes 210 and 120 under control of valve 211 at a pressure at least 0.5 pound greater than the pressure in reactor 116, flows into seal chamber 119. The catalyst flows from seal chamber 119 through the catalyst transfer means 122 in which the diameter or cross-sectional area of the substantially compact column of particle-form solid catalyst increases in accordance with the equation $$\frac{A_2}{A_1} = \left(\frac{P_1}{P_2}\right)^{\frac{1}{n+2}}$$

given hereinbefore (those skilled in the art will realize that catalyst transfer means 122 is not drawn to scale). The pressure decreases from point P to point O in a regular manner as disclosed hereinbefore. The catalyst flows into disengaging chamber 123 provided with vent 124 having valve 125 by means of which when desired a large portion of the sealing gas can be vented. The catalyst flows from disengaging chamber 123 through conduit 126 to catalyst flow control 127 of any suitable type such as an orifice or throttle valve, and thence into conduit 129 from whence it flows along chute 130 to any suitable catalyst transfer means whereby the catalyst is transferred from chute 130 to chute 132. Suitable catalyst transfer means are gas lifts and the like, elevators, etc., 131. The deactivated catalyst flows along chute 132 to kiln or regenerator feed bin 133 and thence through conduit 135 into kiln or regenerator 134 of any suitable type wherein the carbonaceous contaminant or coke can be removed by combustion in a combustion supporting stream of gas such as air. During its flow downwardly as a substantially compact column through kiln or regenerator 134, the hot catalyst contacts cooling coils 140 through which steam from steam drum 143 is drawn through pipe 141 and returned to steam drum 143 through pipe 142. The regenerated catalyst leaves the kiln 134 through conduit 136, flows along chute 137 to any suitable catalyst transfer means 138 whereby the reactivated catalyst is transferred to chute 139 and thence to reactor feed bin 111.

Hydrocarbon reactant comprising at least one hydrocarbon capable of undergoing at least one of the molecular changes, isomerization, dehydrogenation and/or dehydrocyclization, is drawn from a source not shown through line 144 into absorber 145. In its passage downward through absorber 145, the hydrocarbon reactant such as naphtha, straight run or cracked, or a mixture thereof contacts recycle gas comprising hydrogen light hydrocarbons flowing under pressure from liquid gas separator 180 through pipes 182 and 183. Contact with the hydrocarbon reactant in absorber 145 strips the recycle gas of light hydrocarbons and the recycle gas escapes overhead through pipe 184 to refinery fuel gas reservoir or sphere 185. The hydrocarbon reactant plus the hydrocarbons stripped from the recycle gas leaves absorber 145 through line 146, passes through heat exchanger 147 wherein it is in heat exchange with effluent from reactor 116 and flows through line 148 to heater 149 wherein it is heated to a reaction temperature. The heated hydrocarbon reactant flows from furnace 149 through lines 150 and 152 under control of valve 151 through distributor 153 into reactor 116. Recycle gas which is a gaseous heat carrier can be a gas containing less than 25 percent hydrogen or a gas containing about 25 to about 80 percent hydrogen, preferably about 35 to 65 percent hydrogen, and the balance $C_1$ to $C_6$ hydrocarbons drawn under pressure from liquid gas separator 180 through pipes 182 and 154, heat exchanger 155, pipe 156, and pipe 212 into heater 157. In heater 157 the recycle gas is heated to a temperature such that when mixed with a heated hydrocarbon reactant in line 152 in the ratio of about 1 to about 15 mols, preferably about 4 to about 10 mols of gaseous heat carrier, about 1 to about 8 mols preferably about 2 to about 5 mols of recycle gas comprising about 25 to about 80 percent preferably 35 to 60 percent hydrocarbon, balance $C_1$ to $C_6$ hydrocarbons to form the charge mixtures, the charge mixture has a temperature of about 800 to about 1080° F. preferably about 900 to about 1060° F. The average molecular weight of a mixture of hydrocarbons is determined in the usual manner from the ASTM distillation curve. The heated gas flows from heater 157 through pipe 158 under control of valve 159 to line 152 where it mixes with the heated hydrocarbon reactant and flows therewith through distributor 153 into reactor 116. Distributor 153 is of any suitable type whereby the charge mixture can be distributed over the cross-section of reactor 116.

The charge mixture flows partly upwardly countercurrent to the downwardly flowing substantially compact column of particle-form catalyst and the balance, downwardly, concurrent with the downwardly flowing substantially compact column of particle-form catalyst. The distribution of charge mixture between zone U and zone L is controlled and regulated by throttling means 161 and 164 in effluent lines 160 and 163, respectively. Throttling means 161 and 164 are of any suitable type whereby the volume of effluent passing therethrough can be regulated.

The charge mixture flowing upwardly from zone U countercurrent to the downwardly flowing substantially compact column of particle-form catalyst, at least in part, is reformed and together with unreformed charge mixture, recycle gas and make gas, flows through line 160 under control of throttle means 161 which can be a throttle valve into line 162 and thence to line 166.

The charge mixture flowing downwardly from distributor 153 through zone L, at least in part, is reformed and the reformate together with unreformed reactant, recycle gas and make gas flows through line 163 under control of throttle means 164, which can be a throttle valve, into line 165 and thence to line 166 where the two effluents mix and flow through heat exchanger 155 in heat exchange with recycle gas and thence through line 167 to heat exchanger 168 where the mixed effluents are in heat exchange with steam flowing from steam drum 143 through pipes 141, 197 and 198 and returning to steam drum 143 through pipe 199. The mixed effluents flow from heat exchanger 168 through line 169 to heat exchanger 147 and thence through line 170 to condenser 171 where the constituents of the mixed effluents boiling above about 100 to about 125° F. are condensed, the mixture of condensed and uncondensed constituent of the mixed effluents flows along line 172 to liquid gas separator 173 wherein the condensed constituent of the mixed effluents is withdrawn through line 174 and the uncondensed constituent of the mixed effluents pass overhead through pipe 175 to compressor 176 and thence through pipe 177 back to line 174 to mix with the condensed constituent of the mixed effluents. The mixture of gas and liquid effluent flows through condenser 178 and thence through line 179 to liquid gas separator 180. In liquid gas separator 180 the uncondensed constituent of the effluent, i. e., hydrogen light hydrocarbons, flows upwardly through pipe 182 to pipes 154 and 183 and thence either to absorber 145 or back to the reactor through pipe 154. The condensed constituents of the mixed effluents are withdrawn through line 181 to depropanizer 186 from which the light ends pass as overhead through pipe 195 to pipe 184 and thence to refinery fuel system sphere 185. The bottoms of depropanizer 186 flows from line 187 to primary rerun tower 188 from which the light ends flow as overhead through line 196 to high octane gasoline storage 192. The bottoms of primary rerun tower 188 flow through line 189 to a secondary rerun tower 190 from which high octane rating gasoline passes as overhead through line 191 to gasoline storage tank 192. The bottoms from secondary rerun tower 190 flow through line 193 to polymer storage tank 194.

Referring now to catalyst transfer means 122, it will be noted that a pressure somewhat higher, say about 0.5 p. s. i., than the pressure in the reactor is maintained by means of a sealing gas such as steam, flue gas, or preferably recycle gas. The amount of gas required by the reactor sealing and catalyst transfer means 122 is a function of the length of the column and is defined by the equations:

Equation (3) $\quad G = m(PSD)^n \left(\dfrac{D}{Z}\right)^k$ where:

G = gas mass flow rate in lbs./(hr.) (sq. ft.)
P = pressure gradient throughout the conduit or leg in lbs./(sq. in.) (ft.) of conduit
S = gas density in lbs./cu. ft.
Z = gas viscosity in centipoises, and
D = equivalent mean average particle diameter of the granular material by reciprocal mean method in inches. Equivalent refers to the particle diameter equivalent, from a fluid friction standpoint, to spheres (which are given a standard value of 1.0), for example, cylindrical pellets have an equivalent value of 0.85.
$m$ = constant, $1.6 \times 10^4$ to $1.6 \times 10^5$
$n$ = constant, 0.54 to 1.0
$k$ = constant, 0.17 to 1.0

Where a higher degree of accuracy in calculating the amount of gas required by the reactor sealing and catalyst transfer means is required, the following equations can be used:

Equation (4)

$G_0 = M\left(S_o D e \dfrac{P_1^2 - P_1 P_2}{L}\right)^n \left(\dfrac{De}{Z}\right)^k + 0.068(f_1+f_2)\left(\dfrac{G_c S_o P_1}{P_c}\right)$ where:

$G_0$ = total gas supplied to the conduit or leg, based upon the cross-sectional area at level 1 in lbs./hr./sq. ft.
$Gc$ = catalyst flow rate based upon the cross-sectional area of the leg at level 1 in lbs./hr./sq. ft.
$P_1$ = absolute pressure (p. s. i. a.) at level 1
$P_2$ = absolute pressure (p. s. i. a.) at level 2
$So$ = density of gas (lbs./cu. ft.) at 14.7 p. s. i. a. and the temperature of the system
$Z$ = viscosity of gas (centipoise)
$Pc$ = loose bulk density of catalyst in lbs./cu. ft.
$L$ = length of conduit or leg between levels 1 and 2 in feet
$De$ = equivalent average particle diameter of catalyst determined by reciprocal mean method in inches
$f_1$ = fractional interstitial voids (dimensionless)
$f_2$ = fractional pores (dimensionless) based on loose bulk volume of catalyst
$M$ = constant varying between $3.4 \times 10^3$ and $1.1 \times 10^4$
$n$ = constant, varying between 0.54 and 1.0
$k$ = constant, varying between 0.17 and 1.0 or,

Equation (5)

$$G_0 = M\left(\frac{(\Delta P)SDe}{L}\right)^n \left(\frac{De}{Z}\right)^k + (f_1+f_2)\left(\frac{Gcs}{Pc}\right)$$

where:

$G_0$ = total gas supplied to the conduit at its minimum cross-section in lbs./hr./sq. ft.
$Gc$ = catalyst flow rate based upon the minimum cross-section of conduit or leg in lbs./hr./sq. ft.
$\Delta P$ = total pressure drop through the conduit or leg in lbs./sq. in. (p. s. i.)
$L$ = length of conduit or leg in feet
$S$ = density of the gas at the temperature of the system and at the pressure at the minimum cross-section of the conduit or leg
$Z$ = viscosity of the gas at the temperature of the system
$De$, $f_1$, $f_2$ and $Pc$ have same values as in equation 4 (centipoise)
$M$ = constant, varying from $1.6 \times 10^4$ to $1.6 \times 10^5$
$n$ = constant, varying from 0.54 to 1.0
$k$ = constant, varying from 0.17 to 1.0
$f_1$ = the interstices between the particles, is determined experimentally and is the ratio $$\frac{\text{particle density} - \text{bulk density}}{\text{particle density}}$$

$f_2$ = is determined experimentally and is equal to the pore volume of the catalyst particles $(1-f_1)$ The theoretical gas requirement for a conduit or leg or column tapered in accordance with the principles of the present invention 100 feet long operating at a pressure differential of 175 p. s. i. as calculated by Equation 4 checked the requirement determined experimentally. The theoretical gas requirement for a conduit or leg or column tapered in accordance with the principles of the present invention 20 feet long and operating at a pressure differential of 175 p. s. i. as calculated by Equation 3 agreed within 2 percent with the experimentally determined values.

In Figure 6 there is illustrated the application of the principles of the present invention to the removal of particle-form catalytic material from a zone of higher pressure to a zone of lower pressure where the pressure differential is at least 40 p. s. i. The particle-form catalyst in reactor 216 flows through conduit 217 under control of throttling means 218 which can be of any suitable type such as a throttling valve into seal chamber 219. Sealing gas such as steam, flue gas or preferably hydrocarbon recycle gas drawn from pipe 234 under control of valve 233 or steam or flue gas drawn from a source not shown through pipe 231 under control of valve 232 into pipe 220, flows into seal chamber 219 at a pressure at least 0.5 pound greater than the pressure in reactor 216. The catalyst flows from seal chamber 219 through the catalyst transfer means 222 which comprises a series of conduits, A, B, C, D, E, F, and G, each of substantially constant cross-sectional area but each successive one having a cross-sectional area related to the cross-sectional area of the immediately preceding one in accordance with the equation given hereinbefore. The pressure in catalyst transfer means 222 decreases from point P to point O in a regular manner as disclosed hereinbefore. The catalyst flows into settling chamber 223 provided with a vent 224 having a valve 225 by means of which, when desired, a large portion of the sealing gas can be vented. The catalyst flows from the disengaging chamber 223 through conduit 226 to throttling valve 227 of any suitable type such as a throttle valve or an orifice into conduit 229 from whence it flows along chute 230 to any suitable catalyst transfer means whereby the catalyst is transferred from chute 230 to the kiln or regenerator. Suitable catalyst transfer means are gas lifts and the like, elevators, etc., such as 131 in Figure 5. The deactivated catalyst flows through a suitable kiln or regenerator such as kiln 134 in Figure 5, wherein the carbonaceous contaminant on the catalyst is burned off in a combustion supporting stream of gas such as air. The reactivated catalyst is then transferred from the kiln to the reactor feed bin ready for another cycle through the reactor and kiln.

While the present invention, for the purpose of illustration, has been described and discussed in conjunction with the transferring of particle-form solid contact material from a zone of given pressure to a reactor under at least 5 p. s. i. greater pressure and in conjunction with transferring particle-form solid contact mass material from a reactor at a given pressure to a zone under at least 5 p. s. i. lower pressure, it is manifest that although in both illustrative examples the particle-form solid contact mass material flows downwardly, the principles of the present invention are applicable regardless of the direction of flow of the particle-form solid contact mass material since the problem of dissipating the energy of a stream of vapors flowing concurrently or counter-currently with the stream of particle-form solid contact mass material remains substantially the same. Accordingly, the present invention provides a means of dissipating the energy of a stream of vapors commingled with a stream of particle-form solid contact mass material in a manner such that as the length of the column of particle-form solid contact material between any point on the streams of contact mass material and the point of discharge of the vapors becomes less, the diameter or cross-sectional area of the stream of particle-form contact mass material is varied in accordance with the equation, $$\frac{A_2}{A_1} = \left(\frac{P_1}{P_2}\right)^{\frac{1}{n+2}}$$

whereby a substantially constant pressure gradient is obtained.

The present application is a continuation-in-part of our co-pending application Serial No. 108,828 filed August 5, 1949, now abandoned, which was a continuation-in-part of our co-pending application Serial No. 488,686, filed May 27, 1943, now abandoned.

We claim:

1. In an apparatus wherein a particle-form solid contact mass material is fed continuously from a first zone at a given gas pressure into a reactor zone having a gas pressure at least 5 pounds per square inch greater than in said first zone, a reactor zone comprising a reactor, a first zone comprising a bin above said reactor, and a contact mass feed leg therebetween adapted to convey counter-current to an upwardly moving stream of gas a continuous column of contact mass material from said bin at a given gas pressure to said reactor at a gas pressure at least 5 pounds per square inch greater than the gas pressure in said bin, said feed leg having the greatest internal cross-sectional area at the point of lowest gas pressure and having the least internal cross-sectional area at the point of highest gas pressure and the internal cross-sectional area at any point in said feed leg being determined by the equation $$\frac{A_2}{A_1} = \left(\frac{P_1}{P_2}\right)^{\frac{1}{n+2}}$$

where $A_1$ and $A_2$ are the cross-sectional areas of said column at selected levels 1 and 2, $P_1$ and $P_2$ are the absolute gas pressures existing at levels 1 and 2, respectively, said $P_1$ being greater than $P_2$, and $n$ is a constant having a value of minus about 0.6, whereby the pressure drop in the upwardly flowing gas stream is substantially the same for any unit length of said feed leg and said feed leg is substantially shorter for the total pressure differential between said bin and said reactor without substantial disruption of said downwardly moving contact mass column than a feed leg operating under substantially the same total pressure differential having internal cross-sectional areas not determined in accordance with the aforesaid equation.

2. In an apparatus wherein a particle-form solid contact mass material is fed continuously from a bin at a given gas pressure into a reactor at a higher gas pressure, a reactor, a bin above said reactor and a valveless tapered contact mass feed leg therebetween adapted to convey a substantially continuous column of contact mass material from said bin at a given gas pressure to said reactor at a pressure at least 5 p. s. i. g. higher than said given gas pressure, said feed leg having the greatest internal cross-sectional area at the point of lowest gas pressure and having the least internal cross-sectional area at the point of highest gas pressure and the internal cross-sectional area at any point in said feed leg being determined by the equation $$\frac{A_2}{A_1} = \left(\frac{P_1}{P_2}\right)^{\frac{1}{n+2}}$$

where $A_1$ equals area of internal cross-section at the point of greater gas pressure, $A_2$ equals area of internal cross-section at the point of lesser gas pressure, $P_1$ equals absolute gas pressure at area $A_1$, $P_2$ equals absolute gas pressure at area $A_2$ and $n$ equals a constant having a value of $-0.6$ whereby the length of the feed leg is a minimum to give the necessary downward flow of solid contact mass material and to provide a total gas pressure drop without exceeding a gas pressure drop of from about 6 to about 11 inches of water per foot of column for contact masses having densities of about 36 to about 65 pounds per cubic foot, respectively.

3. In an apparatus wherein a particle-form solid contact mass material is fed continuously from a bin at a given gas pressure into a reactor at a gas pressure at least 5 pounds per square inch higher than said given gas pressure, a reactor, a bin above said reactor and a valveless tapered contact mass feed leg therebetween adapted to convey a substantially continuous column of contact mass material from said bin at a given gas pressure to said reactor at a pressure higher than said given gas pressure, said feed leg having the greatest internal cross-sectional area at the point of lowest gas pressure and having the least internal cross-sectional area at the point of highest gas pressure and the internal cross-sectional area at any point in said feed leg being determined by the equation $$\frac{A_2}{A_1} = \left(\frac{P_1}{P_2}\right)^{\frac{1}{n+2}}$$

where $A_1$ and $A_2$ are the cross-sectional areas of said column at selected levels 1 and 2, $P_1$ and $P_2$ are the absolute gas pressures existing at levels 1 and 2, respectively, and $n$ equals a constant having a value of minus about 0.15 to minus about 1.0 whereby the length of the feed leg is a minimum to give the necessary downward flow of solid contact mass material and to provide a total gas pressure drop without exceeding a gas pressure drop of from about 6 to about 11 inches of water per foot of column for contact masses having densities of about 36 to about 65 pounds per cubic foot, respectively.

4. An apparatus for continuously converting hydrocarbon in the presence of particle-form solid contact mass material, which comprises a feed bin at a given pressure, a reactor beneath said feed bin and at a pressure at least 40 p. s. i. higher than the pressure in said feed bin, a reactor sealing and solid particle transfer means between said feed bin and said reactor, said reactor seal means and solid particle transfer means comprising two gas-tight valves and a pressuring chamber therebetween, said gas-tight valves being constructed and arranged to permit the passage of a column of catalyst when said valves are in the open position and to seal said reactor and pressuring chamber when said valves are in the closed position, a reactor sealing and solid particle transfer means beneath said reactor, said reactor seal and solid particle transfer means comprising a conduit having the smallest diameter adjacent said reactor and the largest diameter most distant from said reactor, and the cross-sectional area of said conduit being determined by the equation $$\frac{A_2}{A_1} = \left(\frac{P_1}{P_2}\right)^{\frac{1}{n+2}}$$

where $A_1$ and $A_2$ are the cross-sectional areas of said column at selected levels 1 and 2; $P_1$ and $P_2$ are the absolute gas pressures existing at levels 1 and 2, respectively; and $P_1$ being greater than $P_2$, and $n$ is a constant having a value of minus about 0.15 to minus about 1.0.

5. In an apparatus for continuously converting hydrocarbons wherein a particle-form solid contact mass material moves continuously from a first container at a given pressure to a second container at another pressure, in fluid connection with said first container, the pressure differential between said containers being at least 5 pounds per square inch, a first container, a second container, and a gas-tight valveless tubular conduit between said first container and said second container constructed and arranged to convey a moving continuous column of particle-form contact mass material from said first container to said second container, said conduit having the greatest internal cross-sectional area at the point of lowest gas pressure and having the least internal cross-sectional area at the point of greatest gas pressure, and the cross-sectional area at any point in said conduit being determined by the equation $$\frac{A_2}{A_1} = \left(\frac{P_1}{P_2}\right)^{\frac{1}{n+2}}$$

where $A_1$ and $A_2$ are the cross-sectional areas of said conduit at selected points 1 and 2, respectively, $P_1$ and $P_2$ are the absolute gas pressures existing at points 1 and 2 respectively, said $P_1$ being greater than $P_2$, and $n$ is a constant having a value of minus about 0.15 to minus about 1.0, whereby the pressure drop in a gas stream flowing in said conduit is substantially the same for any unit length of said conduit and said conduit is substantially shorter for the total pressure differential between said first container and said second container without substantial disruption of said moving continuous column of particle-form solid contact mass material than a conduit operating under substantially the same pressure differential having internal cross-sectional areas not determined in accordance with the aforesaid equation.

6. In the movement of a particle form solid contact mass material and gas in mutual contact the improvement that comprises introducing a gas under pressure into a transfer zone occupied by a bed of particle form contact mass material, flowing a stream of said gas through said transfer zone into a low pressure zone maintained at a pressure more than 5 p. s. i. g. below the introduction pressure of said gas while progressively increasing the cross sectional area of said stream in the direction of said low pressure zone to maintain the velocity of said gas below that which will disrupt the bed of contact material.

7. In the movement of a particle form solid contact mass material and gas in mutual contact the improvement that comprises introducing a gas under pressure into a transfer zone occupied by a bed of particle form contact mass material, flowing a stream of said gas through said transfer zone into a low pressure zone maintained at a pressure more than 5 p. s. i. g. below the introduction pressure of said gas while increasing the cross sectional area of said stream in the direction of said low pressure zone to maintain a constant pressure gradient per unit length of stream and to maintain the velocity of the gas of said stream below that which will disrupt the bed of contact material.

8. In the movement of a particle form solid contact mass material and gas in mutual contact the improvement that comprises introducing a gas under pressure into a transfer zone occupied by a bed of particle form contact mass material, flowing a stream of said gas through said transfer zone into a low pressure zone maintained at a pressure more than 5 p. s. i. g. below the introduction pressure of said gas while increasing the cross sectional area of said stream in the direction of said low pressure zone in accordance with the equation $$\frac{A_2}{A_1} = \left(\frac{P_1}{P_2}\right)^{\frac{1}{n+2}}$$

where $A_1$ and $A_2$ represent the cross sectional area of said stream at selected levels 1 and 2 respectively, $P_1$ and $P_2$ are the absolute gas pressures existing at levels 1 and 2 respectively, and $n$ is a constant having a negative value of about 0.15 to about 1.0 whereby the velocity of said gas is maintained below that which will disrupt the bed of contact material.

9. In a process for converting hydrocarbons wherein particle form solid contact mass material is introduced in substantially compact phase through a transfer zone which it substantially fully occupies into a high pressure reaction zone charged with hydrocarbons, the improvement that comprises introducing a stream of high pressure gas from said reaction zone into said transfer zone, flowing said stream of gas through said transfer zone into a low pressure zone maintained at a pressure more than 5 p. s. i. g. below the introduction pressure of said gas while progressively increasing the cross sectional area of said gas stream in the direction of said low pressure zone to maintain the velocity of said gas below that which will disrupt the compact phase condition of said contact mass material, whereby the throughput of hydrocarbons in said reaction zone is about 20% greater than could be obtained if the length of said stream between said reaction zone and said low pressure zone were substantially the same but of constant cross sectional area.

10. In a process for converting hydrocarbons wherein particle form solid contact mass material in substantially compact phase is introduced to and withdrawn from a high pressure zone through transfer zones at least one of which is substantially fully occupied by said material, the improvement which comprises introducing a stream of gas from said high pressure zone into said fully occupied transfer zone, flowing said stream through said fully occupied transfer zone into a low pressure zone maintained at a pressure more than 5 p. s. i. g. below the introduction pressure of said gas while progressively increasing the cross sectional area of said stream in the direction of said low pressure zone to maintain the velocity of said gas below that which will disrupt the compact phase condition of said contact mass material.

References Cited in the file of this patent
UNITED STATES PATENTS

| | | |
|---|---|---|
| 2,320,147 | Layng et al. | May 24, 1943 |
| 2,331,938 | Schutte | Oct. 19, 1943 |
| 2,410,309 | Simpson et al. | Oct. 29, 1946 |
| 2,546,625 | Bergstrom | Mar. 27, 1951 |